United States Patent
Stepper et al.

(10) Patent No.: US 8,504,260 B2
(45) Date of Patent: Aug. 6, 2013

(54) METHOD FOR ACTIVATING A VEHICLE CLUTCH

(75) Inventors: Thorsten Stepper, Waldenbuch (DE);
Joerg Meissner, Bretzfeld (DE); Ralf Trutschel, Beilstein (DE)

(73) Assignee: GETRAG Getriebe-und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 829 days.

(21) Appl. No.: 12/359,999

(22) Filed: Jan. 26, 2009

(65) Prior Publication Data

US 2009/0209392 A1 Aug. 20, 2009

(30) Foreign Application Priority Data

Feb. 14, 2008 (DE) .......................... 10 2008 009 094

(51) Int. Cl.
| | | |
|---|---|---|
| *B60W 10/04* | (2006.01) | |
| *B60W 10/02* | (2006.01) | |
| *G06F 7/00* | (2006.01) | |
| *F16D 25/06* | (2006.01) | |
| *F16D 25/00* | (2006.01) | |
| *F16D 25/12* | (2006.01) | |

(52) U.S. Cl.
USPC ............... 701/51; 477/109; 477/174; 701/67; 701/68; 192/58.6; 192/58.7; 192/85.01; 192/85.63

(58) Field of Classification Search
USPC ........................ 477/174, 109; 701/68, 67, 51; 192/58.6–58.7, 85.01–85.63
See application file for complete search history.

(56) References Cited

U.S. PATENT DOCUMENTS

| | | | | |
|---|---|---|---|---|
| 4,646,891 A | * | 3/1987 | Braun ........................... | 477/175 |
| 5,062,050 A | * | 10/1991 | Petzold et al. .................. | 701/68 |
| 5,190,130 A | * | 3/1993 | Thomas et al. ................ | 477/176 |
| 5,853,076 A | * | 12/1998 | McKee et al. ............... | 192/85.63 |
| 5,902,344 A | * | 5/1999 | Eike et al. ........................ | 701/67 |
| 5,921,885 A | * | 7/1999 | Tabata et al. .................. | 477/107 |
| 5,993,355 A | * | 11/1999 | Nordgård ...................... | 477/174 |
| 6,023,988 A | * | 2/2000 | McKee et al. ............... | 74/336 R |

(Continued)

FOREIGN PATENT DOCUMENTS

| | | |
|---|---|---|
| DE | 100 18 649 A1 | 10/2001 |
| DE | 101 50 597 | 4/2003 |

(Continued)

OTHER PUBLICATIONS

European Search Report; Application No. EP 09 15 0927.

*Primary Examiner* — Mary Cheung
*Assistant Examiner* — Majdi Alsomiri
(74) *Attorney, Agent, or Firm* — Knobbe Martens Olson & Bear LLP

(57) ABSTRACT

A method for activating a clutch of a vehicle drive train. A controller of an electronic control unit generates an electrical desired-value signal corresponding to a desired pressure with which the clutch is to be acted upon. The control unit receives from a sensor an electrical actual-value signal which is to correspond to an actual pressure with which the clutch is acted upon. The sensor measures the pressure at a measurement location which is connected via a transfer link to an action location at which the clutch is acted upon with a clutch pressure. The actual-value signal passes through a transfer element having a delay property before it is delivered to the controller.

15 Claims, 2 Drawing Sheets

(56) References Cited

U.S. PATENT DOCUMENTS

| | | | | |
|---|---|---|---|---|
| 6,139,471 | A | * | 10/2000 | Tsutsui et al. .................. 477/156 |
| 6,276,197 | B1 | * | 8/2001 | Hayashi et al. ............. 73/115.04 |
| H2031 | H | | 6/2002 | Harrell et al. |
| 6,402,659 | B1 | * | 6/2002 | Inoue ............................... 477/39 |
| 6,951,526 | B2 | | 10/2005 | Kuhstrebe et al. |
| 7,356,400 | B2 | * | 4/2008 | Honma et al. .................. 701/67 |
| 2002/0119865 | A1 | | 8/2002 | Fukumoto et al. |
| 2004/0159523 | A1 | | 8/2004 | Duan et al. |
| 2005/0283297 | A1 | | 12/2005 | Surianarayanan et al. |
| 2006/0212204 | A1 | * | 9/2006 | Honma et al. .................. 701/67 |

FOREIGN PATENT DOCUMENTS

| | | |
|---|---|---|
| DE | 600 06 881 T2 | 10/2004 |
| DE | 10 2004 040 207 | 12/2005 |
| EP | 1 757 835 | 2/2007 |
| GB | 2 225 076 | 5/1990 |
| WO | WO 01/20200 | 3/2001 |
| WO | WO 02/25130 | 3/2002 |

\* cited by examiner

METHOD FOR ACTIVATING A VEHICLE CLUTCH

CROSS-REFERENCE TO RELATED APPLICATIONS

This application claims the priority of German patent application DE 10 2008 009 094 filed Feb. 14, 2008.

BACKGROUND OF THE INVENTION

The present invention relates to a method for activating a clutch of a vehicle drive train, in particular of a vehicle drive train with a dual clutch transmission.

Dual clutch transmissions are generally known. They contain a dual clutch arrangement with two parallel friction clutches and a multi-step transmission with two parallel part-transmissions. One branch with a first friction clutch and with a first part-transmission is assigned the odd gear steps. The other branch with the second friction clutch and with the second part-transmission is assigned the even gear steps. The friction clutches are connected on the input side to an engine, for example an internal combustion engine, a hybrid drive unit or the like. The part-transmissions are implemented, as a rule, as spur-wheel transmissions. The connection of the friction clutch arrangement to the part-transmissions takes place via a shaft arrangement with an inner shaft and with a hollow shaft arranged concentrically to the latter.

By the overlapping actuation of the two friction clutches, gear changes can be carried out without any interruption in traction. The actuation of the friction clutches takes place in an automated manner. The actuators used for this purpose must in this case be activated accurately, particularly during the transfer of the drive torque from one friction clutch to the other friction clutch, in order to ensure a jolt-free gear change.

BRIEF SUMMARY OF THE INVENTION

Against the above background, the object of the invention is to specify an improved method for activating a clutch of a vehicle drive train, by means of which, in particular, activation can take place more accurately and/or more quickly. According to a first aspect of the invention, the above object is achieved by means of a method for activating a clutch of a vehicle drive train, a controller of an electronic control unit generating an electrical desired-value signal corresponding to a desired pressure with which the clutch is to be acted upon, the control unit receiving from a sensor an electrical actual-value signal which is to correspond to an actual pressure with which the clutch is acted upon, the sensor measuring the pressure at a measurement location which is connected via a transfer link to an action location at which the clutch is acted upon with a clutch pressure, and the actual-value signal passing through a transfer element having a delay property before it is delivered to the controller.

By means of this method, a problem is solved which arises from the fact that a transfer link with components which cannot be ignored in dynamic terms is arranged between the clutch and the pressure sensor. Where hydraulic clutches are concerned, for example, rotary leadthroughs, hydraulic lines, etc. may be arranged in the transfer link, and these generate a dynamic pressure drop.

This is particularly relevant in what is known as the "filling" of the clutch. This is the process where a clutch is changed from an open state to a state in which the clutch is at what is known as the engagement point ("kiss point"). This point is defined as a value at which the clutch can already transfer a fixed, usually low torque.

In the prior art, a jump signal is generated as a desired-value signal for filling the clutch. As soon as the sensor measures the required desired pressure for a certain period of time, the filling operation is discontinued, since it is then assumed that the clutch is at the engagement point.

In the prior art, however, the accuracy or assignment of the pairs of values of the desired value and actual value was often insufficient, and therefore the further operation of closing the clutch frequently could not be initiated accurately enough. This could lead, particularly in the case of dual clutch transmissions, to a jolt-like behaviour in the overlap phase.

This problem can be overcome by means of the measure according to the invention whereby the actual-value signal is first supplied to a transfer element having a delay property, before it is delivered to the controller. As a result, in particular, a greater control difference between the desired value and the respective actual value can be achieved. The controller can thereby operate more effectively.

The term "delay property" is to be understood in the broad sense in the present context. A delay is accordingly to be achieved in the case of a straightforward delay element. To the same extent, however, this delay property can also be reduced by means of a transfer element which, for example, simulates a PT1 function (PT1 element).

Other types of transfer element are also possible, in so far as these possess a certain delay and/or damping property.

It is particularly preferable if the delay property of the transfer element is a function of the temperature.

In this case, the amount of delay is preferably set lower at higher temperatures, since the system is then more likely to be in a steady state and can in any case operate more accurately.

The temperature may be, for example, the temperature of a fluid, such as an oil, by means of which the clutch is activated. Alternatively, the temperature may also be the temperature of an electric actuator motor or an assigned power stage. However, the temperature is preferably a temperature which is in relation to the temperature of the clutch itself, preferably in a proportional relation.

According to a further preferred embodiment, the delay property of the transfer element is a function of the desired pressure.

At higher pressures, the amount of delay of the transfer element is set correspondingly lower, since, in this case, the controller in any case acquires a relatively high control difference.

Instead of the desired pressure, the amount of differential pressure between the outlet pressure and the desired pressure may also be used.

Overall, it is advantageous if the clutch is actuated fluidically, in particular hydraulically, and if the actual-value signal is a pressure signal from a pressure sensor.

Alternatively, however, it is also possible for the clutch to be actuated electromechanically or electromagnetically, the actual-value signal being a current signal from an electrical current sensor.

Where a hydraulic actuator is concerned, the influence of a hydraulic transfer link may be particularly pronounced, and therefore the invention possesses special benefits. However, in the case of an electrical actuator, too, a transfer link between the measurement location and the action location may be present, which can be compensated by means of the method according to the invention.

According to a second aspect of the present invention, the above object is achieved by means of a method for activating a clutch of a vehicle drive train, an electronic control unit generating an electrical desired-value signal corresponding to a desired pressure with which the clutch is to be acted upon, the control unit receiving from a sensor an electrical actual-value signal which is to correspond to an actual pressure with which the clutch is acted upon, and the desired-value signal being modulated with a higher-frequency signal (dither) in order to minimize hysteresis effects.

It has been shown that the modulation of the desired-value signal with a higher-frequency signal can minimize hysteresis effects of the clutch. Thereby, it can be achieved that the clutch piston stands reproducibly in the same position at the end of the filling phase. Subsequent pressure regulation (for example, for an overlap operation in a dual clutch transmission) can thereby be coordinated more effectively.

The abovementioned method according to the second aspect of the present invention can advantageously be combined with the method according to the first aspect of the present invention.

Overall, according to the invention, it is advantageous if the desired-value signal is generated, during a filling phase of the clutch, starting from an open basic state of the clutch in the direction of an engagement point of the clutch.

It will thus be appreciated that the method according to the invention can be employed particularly during the filling phase. In general, however, the method according to the invention may also be used in other phases of clutch activation.

It is particularly advantageous if the desired-value signal is modulated with the higher-frequency signal at least during a segment of the filling phase.

This is preferably an initial segment of the filling phase, such that modulation is used only in what is known as the "soft" range of the clutch. The "soft" range is the clutch activation range in which the clutch cannot yet transfer any torque. Consequently, the modulation of the desired-value signal is preferably discontinued a specific time before the prognosticated reaching of the engagement point at which torque transfer overshoots a specific amount.

According to a further preferred embodiment, the desired-value signal is generated by the control unit, during a filling phase of the clutch, starting from an open basic state of the clutch in the direction of an engagement point of the clutch, first in the form of an unregulated, that is to say controlled, signal and subsequently in the form of a regulated signal as a function of an actual value.

By means of the measure of first carrying out the filling phase by means of an unregulated, that is to say controlled, signal as a desired-value signal, a filling characteristic which leads to a more rapid filling of the clutch can be achieved.

The notion of first predetermining the desired-value signal for filling the clutch by means of an unregulated, controlled signal and only thereafter changing to a regulating operation is considered to be a specific invention independently of the use of the desired-value signal modulation and independently of the use of a transfer element with a delay property for the actual-value signal.

In this case, it is particularly advantageous if the unregulated signal is an enhanced signal.

An enhanced signal is understood to mean a signal which is controlled such that it lies at least partially above the aimed-for desired value for reaching the engagement point of the clutch.

For example, the enhanced controlled signal may acquire a PDT1 characteristic, that is to say initially a high peak value and then a falling curve. The falling curve may occur in a similar way to a PT1 element or in a similar way to a PI function.

The actual regulation of the signal in the subsequent phase may take place, for example, via a PI controller.

Overall, it will be appreciated that the present invention can be applied to any type of friction clutch, in particular to friction clutches of vehicle transmissions, such as, for example, starting clutches. The clutch may be a dry clutch, but is preferably a wet-running clutch, such as a wet-running multiple-disc clutch.

It will be appreciated that the features mentioned above and those yet to be explained below can be used not only in the combination specified in each case, but also in other combinations or alone, without departing from the scope of the present invention.

BRIEF DESCRIPTION OF THE SEVERAL VIEWS OF THE DRAWING

Exemplary embodiments of the invention are illustrated in the drawing and are explained in more detail in the following description. In the drawing.

DETAILED DESCRIPTION OF THE INVENTION

Figure 1:
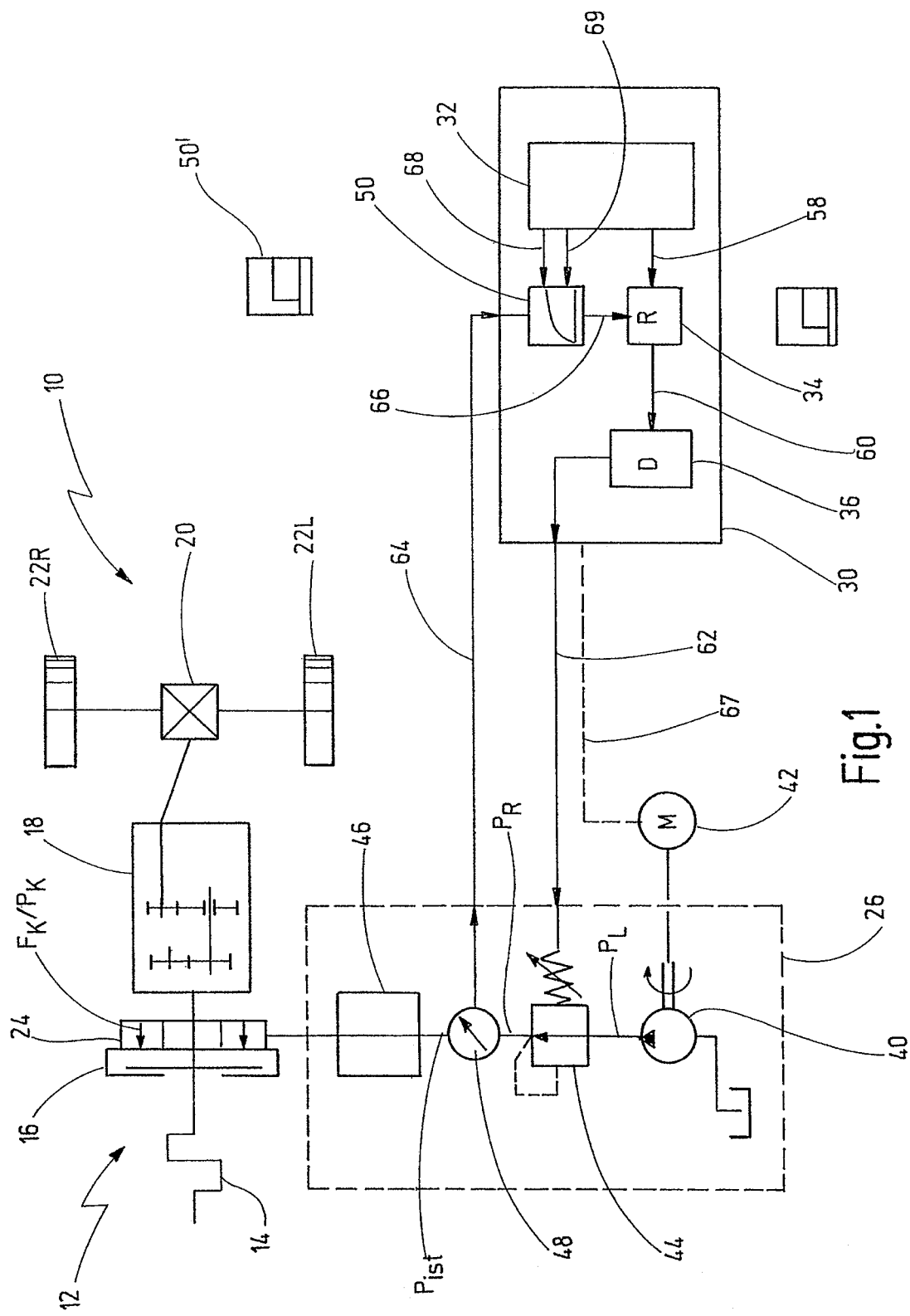
FIG. 1 shows a diagrammatic illustration of a motor vehicle with a drive train having a clutch which can be activated according to the invention.

In FIG. 1, a motor vehicle, such as a passenger car, is designated in general by 10. The motor vehicle 10 has a drive train 12 with an engine 14. The engine 14 may be, for example, an internal combustion engine or a hybrid drive unit. Furthermore, the drive train 12 has a friction clutch 16 which, in the present case, is illustrated as an individual clutch in the form of a starting clutch. The drive train 12 correspondingly has a multi-step transmission 18, for example in the form of a spur-wheel or countershaft transmission. The output of the multi-step transmission 18 is connected to an axle transmission 20 which distributes the drive power to driven wheels 22L, 22R of the motor vehicle 10.

Although, in the present case, a drive train 12 having only one friction clutch 16 and having one multi-step transmission 18 is illustrated, it will be appreciated that the present invention is employed preferably in the case of dual clutch transmissions which have two such friction clutches and two part-transmissions. The below-described methods for activating the individual friction clutch 16 can, in the case of the dual clutch transmission, be applied separately in each case to both clutches.

Although it is possible to actuate the friction clutch 16 by means of an electric motor or an electromagnet (that is to say, electrically), in the present case hydraulic actuation by means of a hydraulic actuator 24 takes place. The latter conventionally has a piston which presses against the clutch via a hydraulic fluid (for example, an ATF oil), specifically with a force $F_K$ which is proportional to a clutch pressure $P_K$.

The hydraulic actuator 24 is activated via a hydraulic circuit 26. Furthermore, the motor vehicle 10 has an electrical control unit 30 by means of which the hydraulic circuit 26 can be activated.

The electrical control unit 30 has a control device 32, for example in the form of a microcontroller, and a regulating controller 34. The controller 34 may be part of the control device 32 or be provided as a separate component within the control unit 30. Furthermore, the control unit 30 contains a digital/analogue converter 36 which converts digital control signals from the controller 34 into analogue signals which are supplied to the hydraulic circuit 26.

The hydraulic circuit 26 has a fluid pump 40 which, in conjunction with a pressure-regulating valve, generates a line pressure $P_L$. The fluid is in this case sucked in from a tank, not designated in any more detail. The pump 40 may then be driven, for example, by means of an electric motor 42 (or, as a secondary assembly, via the crankshaft of the engine 14).

The fluid provided by the pump 40 can be used for cooling the friction clutch 16. For the sake of a clearer illustration, these lines are not illustrated. Furthermore, the hydraulic circuit 26 has a pressure-regulating valve (in particular, a pressure-reducing valve) 44 which from the line pressure $P_L$ generates a regulated pressure $P_R$ for activating the hydraulic actuator 24. The regulated pressure $P_R$ is made available to the actuator 24 via a hydraulic transfer link 46 (for example, a rotary leadthrough, hydraulic lines, etc.).

Moreover, the hydraulic circuit 26 contains a pressure sensor 48 which is provided in assignment to the pressure-regulating valve 44. In other words, the hydraulic transfer link 46 is arranged between the pressure sensor 48 and the actuator 24.

Furthermore, the control unit 30 has a transfer element 50, by means of which a signal from the pressure sensor 48 is subjected to a delay or damping before this signal is supplied to the controller 34. The transfer element 50 may in this case be part of the control device 32, that is to say be simulated by software.

The control device 32 generates a signal for a desired pressure 58 on the basis of overriding control parameters. This signal is delivered to the controller 34. The controller 34 generates a digital desired-value signal 60 which is converted in the digital/analogue converter 34 into an analogue desired-value signal 62. The analogue desired-value signal 62 is supplied to the pressure-regulating valve 44 and controls the regulated pressure $P_R$.

The pressure sensor 48 generates an actual-value signal 64 ($P_{ist}$) which is entered in the transfer element 50. In the transfer element 50, the actual-value signal 64 experiences a delay or damping. The actual-value signal 66 thus corrected is supplied to the controller 34.

Moreover, the control unit 30 may also be designed for providing a motor control signal 67 for the electric motor 42. FIG. 1 also shows that the control device 32 sets the delay property of the transfer element 50 as a function of the temperature (temperature-setting signal 68). Alternatively or additionally, the delay property of the transfer element 50 may also be set as a function of the desired pressure 58 generated in each case (shown via desired-pressure setting signal 69).

In general terms, the transfer element 50 can be used within the frame-work of the activation of the friction clutch 16. Preferably, however, it is used when the clutch 16 is being filled, that is to say is being changed from an open state to a state in which the engagement point of the clutch is reached. In other cases the transfer element 50 may even be bypassed, if necessary.

By means of the transfer element 50, an exact control difference between the desired pressure and the actual pressure in the clutch piston space can be calculated on the basis of the measured signal 64. The controller can thereby operate more effectively. At higher temperatures, the delay property may be reduced somewhat. Correspondingly, in the case of higher desired pressures (and/or higher actual pressures downstream of the delay element 66), the delay property may likewise be reduced.

Although this is not illustrated in FIG. 1, an electric actuator may also be used instead of a hydraulic actuator 24. In this case, instead of a hydraulic circuit 26, an electric or electronic circuit would be used, by means of which the corresponding activation signals for the electrical actuator are generated. In this case, too, an electrical transfer link (corresponding to the transfer link 46) may lie between the value of a then customary electrical current measurement (corresponding to the pressure sensor 48) and the location at which the electrical current is ultimately used by virtue of the electrical actuator 24. Even in this case, therefore, a transfer element 50 of the type described above may be used.

Figure 2:
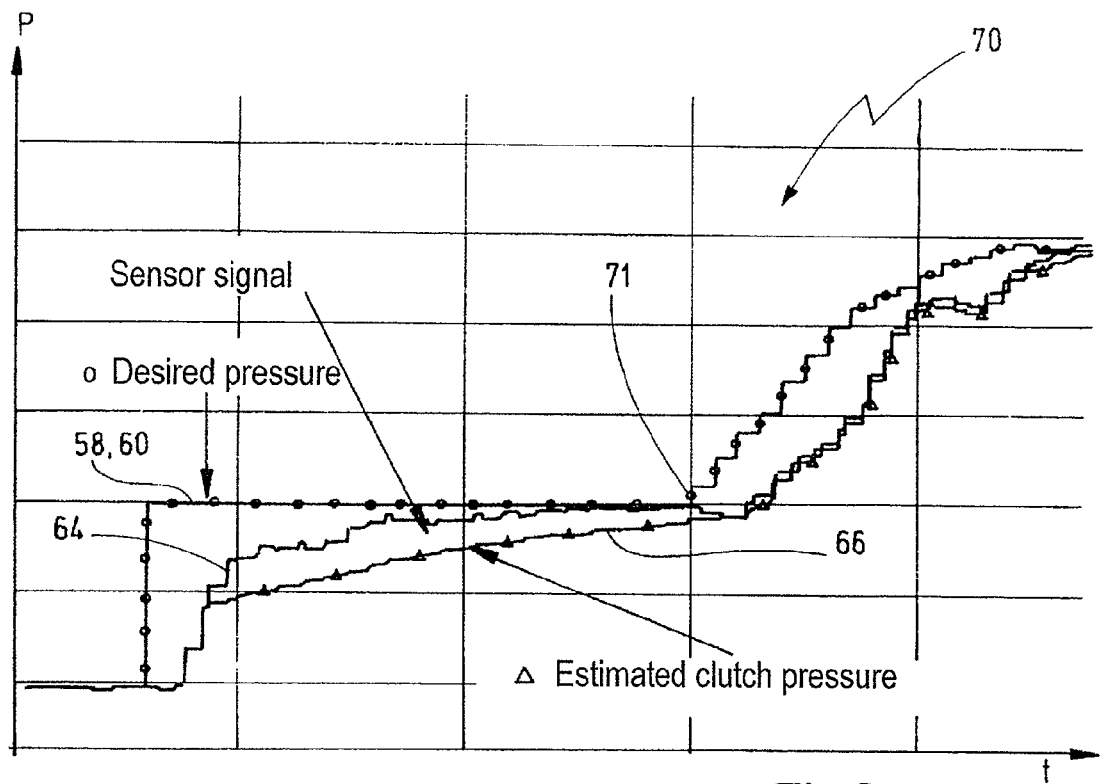
FIG. 2 shows a graph of signals in the activation of a vehicle clutch during a filling phase, specifically according to a first aspect of the present invention.
Figure 3:
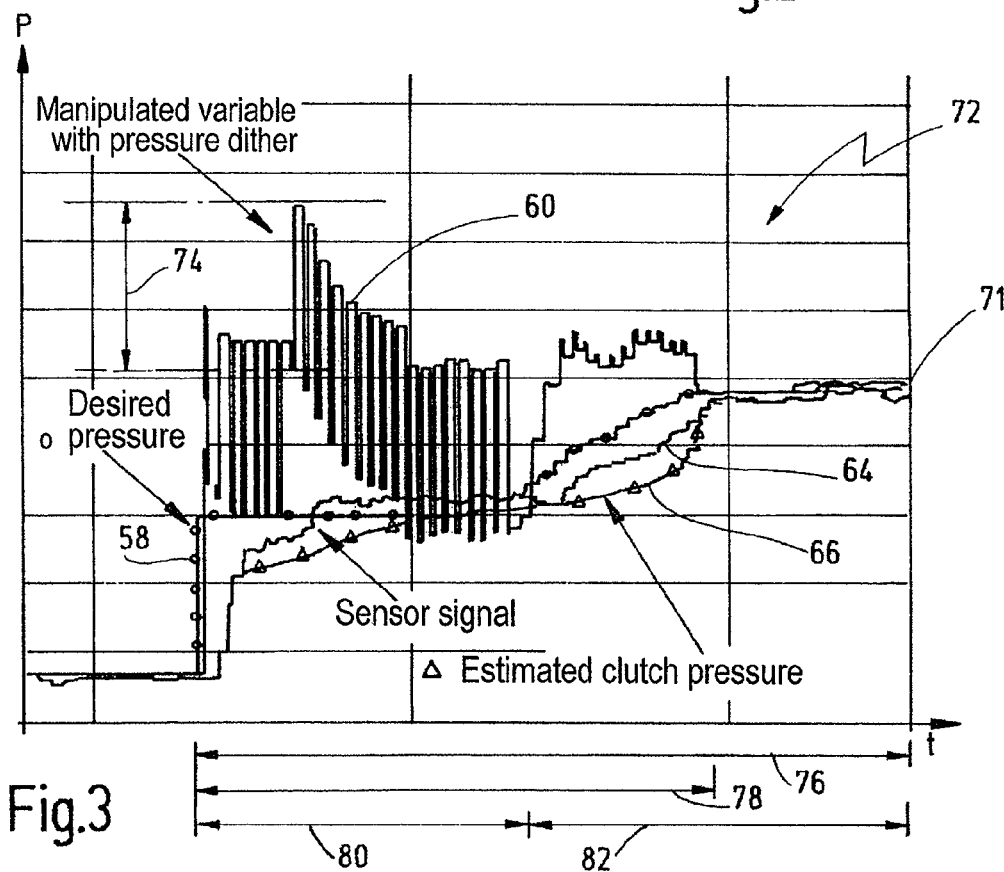
FIG. 3 shows a graph, comparable to FIG. 2, in which the filling phase is carried out, using the methods according to the first and the second aspect of the invention.

FIGS. 2 and 3 illustrate in each case a filling operation for a clutch 16 against time t.

FIG. 2 shows a graph 70 in which the filling operation is initiated by a rise in the desired pressure by means of a jump signal. The filling phase ends essentially at a time point 71. The graph 70 illustrates, furthermore, the actual-value signal 64 generated by the pressure sensor 48 (sensor signal). Moreover, the corrected actual pressure 66 determined on the basis of the transfer element 50 is illustrated in the graph 70 ("estimated clutch pressure").

It can be seen that a relatively high control deviation is implemented immediately after the start of the filling phase. The result of this is that the controller 34 can operate more effectively.

The transfer element 50 with its delay or damping property virtually simulates the transfer link 46. The transfer element 50 consequently fulfils the function of a pressure observer, by means of which the actual pressure in the actuator 24 is estimated. This is because, by virtue of the transfer link 46, the regulated pressure $P_R$ present at a specific time point in the region of the measurement location of the sensor 48 will "arrive" in the hydraulic actuator 24 as the clutch pressure $P_K$ only a certain amount of time later. By the pressure being influenced dynamically in this way by the transfer link 46, the actual pressure $P_{ist}$ measured by the sensor 48 does not correspond to the actual pressure $P_K$ in the actuator 24. This can be compensated by means of the transfer element 50. Since the transfer element 50 possesses a delay property which is a function of the temperature and/or of the desired pressure (arrows 68, 69), the dynamic behaviour of the transfer link 46 can be estimated more realistically and consequently compensated.

FIG. 3 illustrates a graph 72 which corresponds in its general set-up to the graph 70 of FIG. 2.

In the graph 72, a desired-value signal (manipulated variable with pressure former) 60 is generated from the desired pressure 58 in the controller 34 (or even in the control device 32) and is modulated with a high-frequency signal having a modulation amplitude 74. In other words, a "dither" signal is superposed on the desired-value signal. Hysteresis effects in the actuator 24 can thereby be minimized. What can be achieved is that the position of the clutch at the end of the filling phase stands reproducibly in the same position. Subsequent pressure regulation can be coordinated more effectively.

The filling phase of the clutch 16 is illustrated at 76 in FIG. 3 and lasts from the raising of the desired pressure until the engagement point is reached (at 71).

The modulation of the desired-value signal 60 in this case takes place in a modulation phase 78 which ends markedly before the engagement point 71. As a result, modulation is performed only in a "soft" range of the clutch, so that no influences can be exerted on the drive train (in particular, no transfer of vibrations to the drive train).

Furthermore, in the activation method of FIG. 3, the filling phase 76 is subdivided into a control phase 80 and a regulating phase 82. In the initial control phase 80, the desired-value signal 60 is not regulated in the manner of a feedback, but is predetermined by control. The signal may in this case possess, for example, the characteristic of a PDT1 function. In this case, at the start of the control phase 80, the desired-value signal 60 acquires a relatively high peak value which lies markedly above the desired pressure. From this, the signal can then fall slightly again, for example in the manner of a PT1 element or a PI element. The control phase 80 likewise ends markedly before the engagement point is reached, in particular even before the end of the modulation phase 78. In the subsequent regulating phase 82, a regulating operation, using the actual-value signal 64 (or the corrected actual-value signal 66) is carried out in the controller 34. In the regulating phase 82, the modulation amplitude 74 may be markedly reduced.

By the filling phase being divided into a control phase 80 and a regulating phase 82, a relatively rapid rise of the corresponding pressure values (of the regulated pressure $P_R$ and consequently also of the clutch pressure $P_K$) can be imparted to the system by means of the controlled desired-value signal 60. By means of the subsequent regulating phase 82, an exact positioning or set-up of the clutch 16 for the engagement point 71 can take place.

What is claimed is:

1. Method for activating a clutch of a vehicle drive train, a controller of an electronic control unit generating an electrical desired-value signal corresponding to a desired pressure with which the clutch is to be acted upon, the control unit receiving from a sensor an electrical actual-value signal which is to correspond to an actual pressure with which the clutch is acted upon, the sensor measuring the pressure at a measurement location which is connected via a transfer link to an action location at which the clutch is acted upon with a clutch pressure, wherein the transfer link includes hydraulic components which cannot be ignored in dynamic terms and is arranged between the clutch and the pressure sensor, and the actual-value signal passing through a transfer element having a predetermined delay property before it is delivered to the controller, the predetermined delay property simulating a delay property of the transfer link.

2. Activation method according to claim 1, the transfer element having a PT1 element.

3. Activation method according to claim 1, the transfer element having a simple delay element.

4. Activation method according to claim 1, the delay property of the transfer element being a function of the temperature.

5. Activation method according to claim 1, the delay property of the transfer element being a function of the desired pressure.

6. Activation method according to claim 1, the clutch being actuated fluidically, and the actual-value signal being a pressure signal from a pressure sensor.

7. Activation method according to claim 1, the clutch being actuated electromechanically or electromagnetically, and the actual-value signal being a current signal from an electrical current sensor.

8. Activation method according to claim 1, the desired-value signal being modulated with a higher-frequency dither signal in order to minimize hysteresis effects.

9. Method according to claim 1, the desired-value signal being generated, during a filling phase of the clutch, starting from an open basic state of the clutch in the direction of an engagement point of the clutch.

10. Method according to claim 1, the desired-value signal being generated, during a filling phase of the clutch, by the control unit, starting from an open basic state of the clutch in the direction of an engagement point of the clutch, first in the form of an unregulated signal and subsequently as a regulated signal as a function of an actual value.

11. Method for activating a clutch of a vehicle drive train, an electronic control unit generating an electrical desired-value signal corresponding to a desired pressure with which the clutch is to be acted upon, the control unit receiving from a sensor an electrical actual-value signal which is to correspond to an actual pressure with which the clutch is acted upon, wherein the transfer link includes hydraulic components which cannot be ignored in dynamic terms and is arranged between the clutch and the pressure sensor, the actual-value signal passing through a transfer element having a predetermined delay property before it is delivered to a controller of the electronic control unit, the predetermined delay property simulating a delay property of the transfer link, and the desired-value signal being modulated with a higher frequency dither signal in order to minimize hysteresis effects 12. Method according to claim 11, the desired-value signal being generated, during a filling phase of the clutch, starting from an open basic state of the clutch in the direction of an engagement point of the clutch.

13. Method according to claim 12, the desired-value signal being modulated with the higher-frequency signal at least during a segment of the filling phase.

14. Method according to claim 11, the desired-value signal being generated, during a filling phase of the clutch, by the control unit, starting from an open basic state of the clutch in the direction of an engagement point of the clutch, first in the form of an unregulated signal and subsequently as a regulated signal as a function of an actual value.

15. Method according to claim 14, the unregulated signal being an enhanced signal.

* * * * *